F. H. VAN HOUTEN.
APPARATUS FOR CUTTING AND SHAPING LUMPS OF DOUGH.
APPLICATION FILED JULY 28, 1915.
1,317,742.
Patented Oct. 7, 1919.
3 SHEETS—SHEET 1.
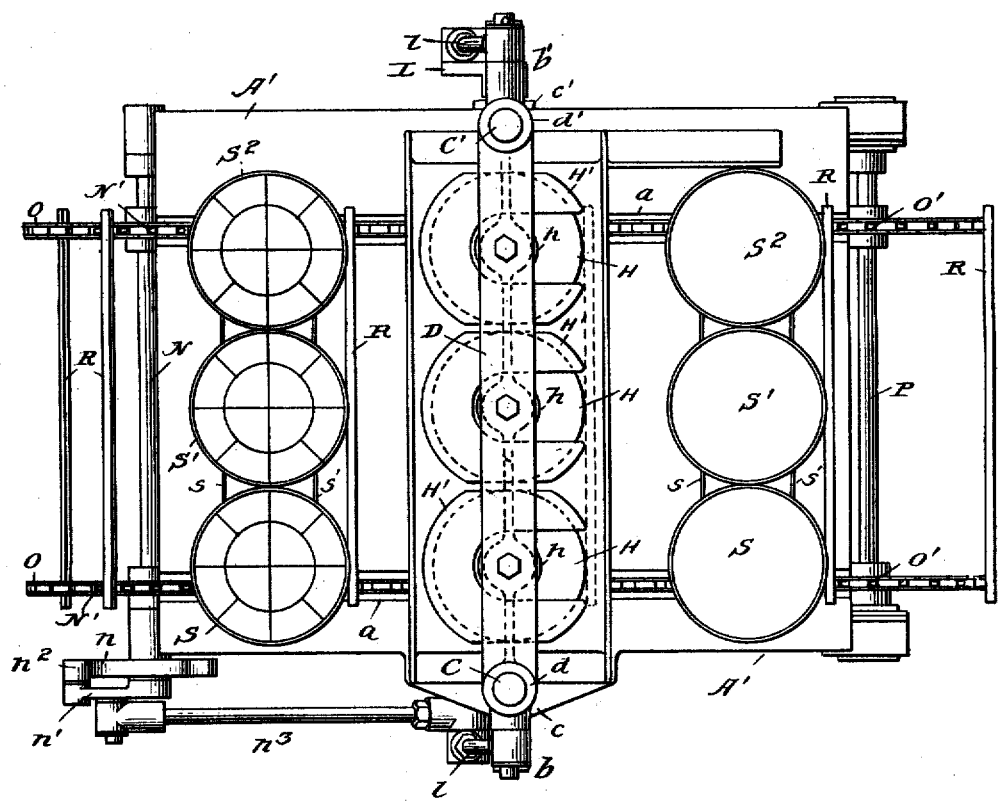
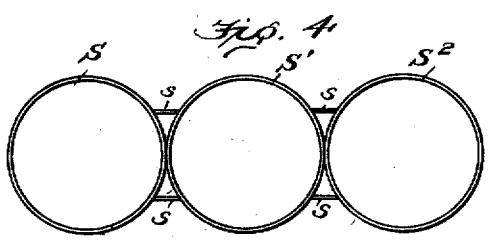
Inventor
Frank H. Van Houten
By Church & Church
his Attorney

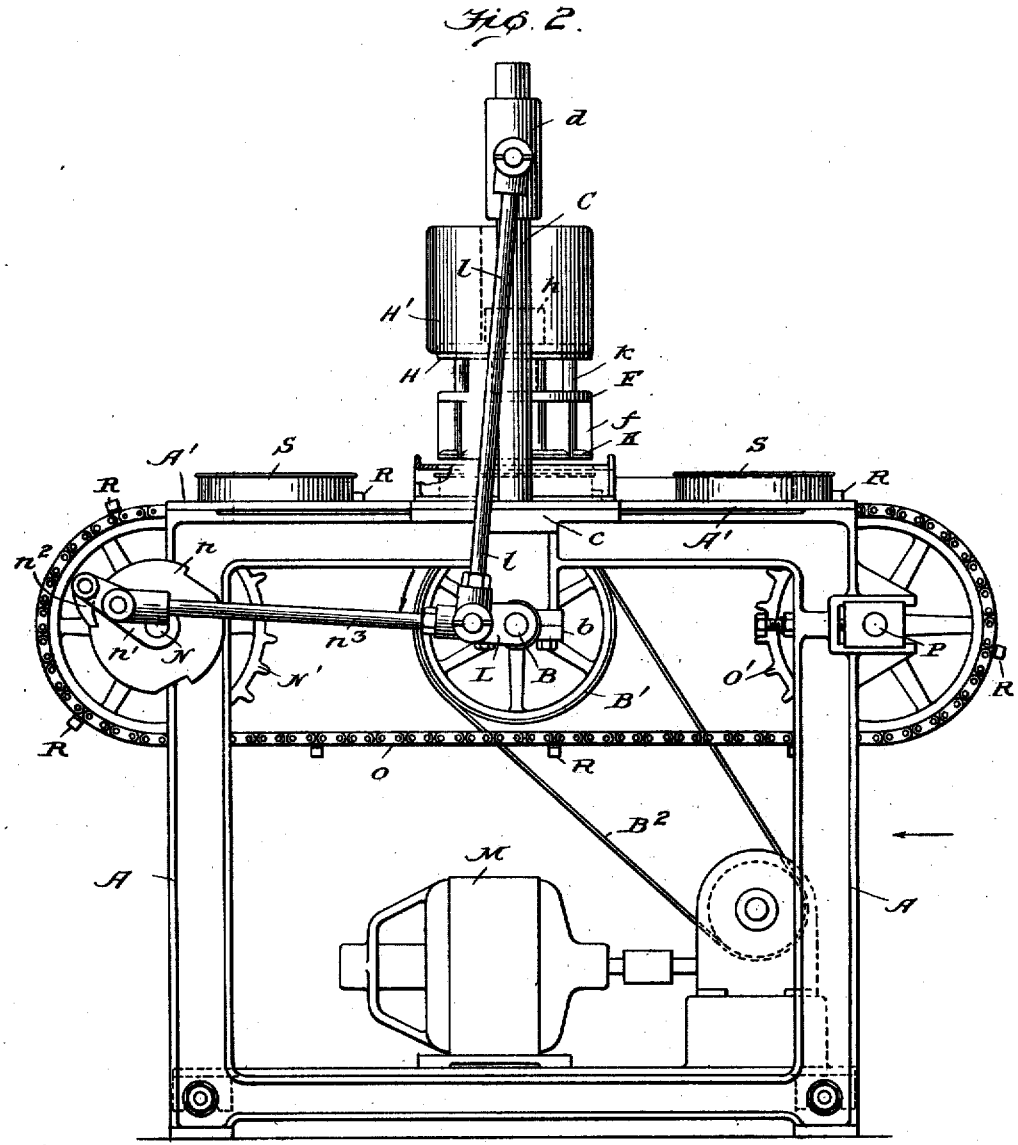

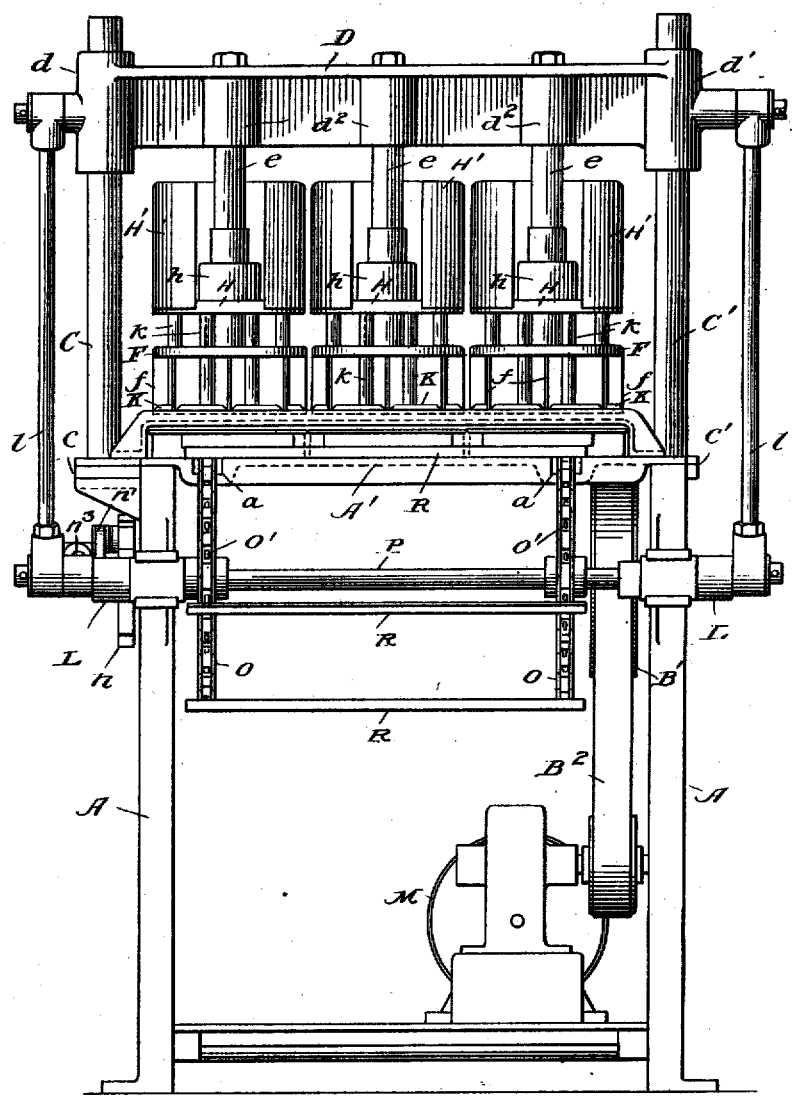

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

APPARATUS FOR CUTTING AND SHAPING LUMPS OF DOUGH.

1,317,742.     Specification of Letters Patent.     Patented Oct. 7, 1919.

Application filed July 28, 1915. Serial No. 42,493.

*To all whom it may concern:*

Be it known that I, FRANK H. VAN HOUTEN, a citizen of the United States, residing at Beacon, in the county of Dutchess and State of New York, have invented certain new and useful Improvements in Apparatus for Cutting and Shaping Lumps of Dough; and I do hereby declare the following to be a full, clear, and exact description of the same, reference being had to the accompanying drawings, forming part of this specification, and to the figures and letters of reference marked thereon.

This invention relates generally to improvements in apparatus for cutting and shaping lumps of dough. More particularly the invention resides in a novel machine for cutting biscuit loaves, and the primary object of the invention is the provision of a novel feed of the dough to the shaping and cutting element which results in a greatly increased capacity per machine.

The improvements of the present invention are preferably embodied in that type of biscuit loaf machine wherein the dough is divided in a pan or receptacle into which the lump of dough has been placed, and the pan or receptacle is then placed in the machine.

Other objects of the invention are to generally improve the construction of machines of the above type, and a full understanding thereof will be attained from the ensuing detail description when taken in connection with the accompanying drawings which illustrate a construction embodying the invention in a preferred form. The novel features of the invention will be particularly pointed out and specified in the appended claims.

In the drawings,—

Figure 1 is a plan of a machine for cutting biscuit loaves embodying the present improvements.

Fig. 2 is a side elevation thereof.

Fig. 3 is an end elevation looking in the direction of the arrow of Fig. 2.

Fig. 4 is a detail view illustrating an arrangement of dough pans used in connection with the present machine.

Like characters of reference indicate the same parts throughout the several views.

As shown in the drawing, the parts of a biscuit cutting machine are supported by a suitable framework or table A having a bed plate or base A' which forms the support for the dough pans during the cutting and shaping of the lumps of dough into biscuit loaves. Journaled in boxes $b$, $b'$ located centrally between the ends of frame A and on each side of bed plate A' is a transverse shaft B having a drive pulley B' whereby the shaft may be driven. In the present instance, motion is imparted to pulley B' by a belt $B^2$, driven by any suitable means, such as an electric motor M located within the frame A. Projecting centrally from bed plate A' and on opposite sides thereof, are brackets $c$, $c'$, respectively, and supported by said brackets are vertical side rods C, C'. The dough cutting and shaping elements are preferably of that type comprising a knife frame with the radially arranged knives for cutting the dough in the pans into segments or separable individual biscuits, and the presser frame which rests on the dough during the cutting operation thereof spreads it out into the required thickness. Extending transversely of bed plate A' is a head beam D, provided at its respective ends with sleeves $d$, $d'$, which embrace and are adapted to slide on the respective rods C, C'. Fixed in sleeve like portions $d^2$ of head beam D are shanks $e$, each shank forming a supporting medium for a presser frame and a knife-frame, and, as shown, three shanks with their respective frames are provided, for purposes which will presently appear. Inasmuch as the several presser and knife frames are substantially similar in construction and arrangement, the following description of one will suffice for all:—

The support for the knives preferably consists of a spider or frame F secured in any suitable manner to the lower extremity of a shank $e$ and from which depend the knives $f$. The knives $f$ may be radially arranged on the spider or frame F to cut the dough into segments or individual biscuits according to the design illustrated in Fig. 4 of the drawings. Surrounding spindle $e$ above frame F is a sleeve $h$ having at its lower end a flange or head H, and upon said head H is supported a detachable weight H'. Located in the spaces between the knives are presser faces or plates K, having spindles $k$ which project freely through support F. Sleeve $h$ with head H are slidable on shanks $e$, and spindles $k$ of plates K are also slidable with respect to support F.

From the above description, it will be noted that frames F and knives $f$ constituting the knife frames are raised and lowered as raising and lowering movements are imparted to shanks $e$; on the contrary, sleeves $h$, heads H, weights H' and presser plates K, these constituting the presser frames, are free in the movements by reason of the slidable mounting of sleeves $h$ on shanks $e$ and plates K in frames F. Under the action of gravity, however, the presser frames follow the knife frames downwardly, when the head beam D is moved in that direction, and, on the other hand, when head beam D is elevated, the presser frames are positively elevated by the engagement of frames F with heads H. Assuming that pans filled with dough are in proper position for cutting the dough into biscuit loaves, it will be noted that, under preliminary movement of head beam D, presser faces K are in alinement with the edges of knives $f$, and the weight of the descending presser faces causes the dough in the pans, upon contact with them, to spread out and condense in the bottom of the pan. The pressure of the dough forces the freely movable presser faces K upwardly between the knives $f$, the spindles $k$ of said faces being connected to the head H transmit the downward pressure of weight H' to the dough, the entire presser frame at this period of the operation being supported by the dough itself. Further movement of head beam D forces the knives $f$ into the dough to divide it into segments or individual biscuits.

Upward and lowering movement is imparted to the presser and knife frames by means of the following connections from the main drive shaft B. Fixed to the drive shaft at its ends are cranks L which, upon rotation of the shaft, impart reciprocatory motion to connecting rods $l$. Said connecting rods $l$ are pivoted to the sleeves $d$, $d'$ of head beam D and accordingly, rotation of shaft B is effective to reciprocate head beam D with its connected pressure and knife frames, sleeves $d$, $d'$ sliding on guide rods C, C'.

The invention provides means for automatically progressing a dough supporting element, such as a dough pan across the path of the cutting and shaping element and for holding the pan stationary while in the path of the cutting element and during working of the dough. This is effected by providing an intermittent feed for the pans and timing the periods of rest of the pans to correspond with the periods of lowering movement of head beam D. Fixed to each end of a transverse shaft N are drive sprockets N' and a ratchet $n$. Mounted for free oscillation on shaft N are cranks $n'$ having a pawl $n^2$. Crank $n'$ is connected by a rod $n^3$ to a crank L on main drive shaft B. By reference to Fig. 2 it will be observed that pawl $n^2$ is adapted to impart an intermittent movement to sprockets N' and the connections between said pawl and main drive shaft B are so arranged that sprockets N' are at rest during half a revolution of the main drive shaft, and in motion during the other half of a revolution. Main drive shaft, however, while rotating one half a revolution, will impart a third of a revolution to shaft N and sprockets N'. This may be effected by providing ratchet $n$ with three equally spaced teeth, as shown, whereby each alternate half-revolution of shaft B transmits through pawl $n^2$ a third of a revolution to shaft N and sprockets N'. During the periods of rest of the sprockets N', the head beam D is lowered, bringing the presser and knife frames into operative engagement with the dough in the pans beneath. The next half revolution of drive shaft B elevates head beam D to its highest point, at the same time through the engagement of pawl $n^2$ with a tooth of ratchet $n$ carrying sprockets N' one third of a revolution forward. Shaft N is journaled at the delivery end of bed plate A and each sprocket N is provided with an endless belt or conveyer O, said belts being guided in their movements by longitudinal slots $a$ in bed plate A. At the feed end of bed plate A the respective conveyer belts O pass over idler sprockets O' mounted at the ends of a transverse shaft P journaled in the framework. Connecting the belts O transversely, are pan positioning rods R, said rods being preferably spaced in accord with the movements of the belts whereby a rod at the feed end of the table will be carried by the next movement of the belts into proper position with respect to the presser and knife frame mounted on head beam D.

A preferred arrangement of pans is illustrated in Fig. 4 of the drawings. As shown, three pans S, S', S² are connected by ties $s$, $s'$, to form a unit. The pans are positioned on the conveyer belts O by placing them against a rod R and one third of a revolution of drive sprockets N' is sufficient to carry them into proper position beneath the presser and knife frames. During the next half revolution of main drive shaft B, the pans are held stationary in this position and the lowering movement of head beam D, which is now effected, brings the dough cutting and pressing frames into their proper biscuit cutting functions with respect to the dough in the pans. The next half revolution of drive shaft B carries the completed loaves to the discharge end of bed plate A and at the same time advances a new batch of pans beneath the cutting and pressing frames. This arrangement, while insuring a proper working and cutting of the dough in the pans, at the same time provides one biscuit making operation for each lowering movement of the head beam D and thereby results in a maximum output per machine.

What is claimed is:—

1. In a machine for preparing biscuit loaves in baking pans preparatory to baking, the combination of means for compressing a ball of dough, confining means consisting of baking pans each having a bottom and side walls coöperating with said means for limiting the flow of dough in all directions whereby a predetermined shaped mass is obtained, means for cutting the confined mass of dough and rendering the compressing means inoperative, and means for presenting successive confining means to the action of the compressing means after each operation of the cutting means, whereby a ball of dough may be automatically compressed, cut, and fed to the oven directly from the dividing machine.

2. In a dough handling machine, the combination of means for compressing a ball of dough in a bake pan, cutting means for severing the compressed dough into portions, means for advancing successive pans of dough into position to be acted upon by the compressing means and the cutting means, and operating means for causing a constant movement of the cutting means, and an intermittent movement of the pan advancing means, whereby dough may be transferred automatically from the dough divider to the bake oven.

FRANK H. VAN HOUTEN.

Witnesses:
WILLIAM T. STRIPPEL,
ANNA F. DEVEREAUX.

Copies of this patent may be obtained for five cents each, by addressing the "Commissioner of Patents, Washington, D. C."